US005530543A

United States Patent [19]
Hercher

[11] Patent Number: 5,530,543
[45] Date of Patent: Jun. 25, 1996

[54] DETECTOR ARRAY FOR USE IN INTERFEROMETRIC METROLOGY SYSTEMS

[75] Inventor: Michael Hercher, Marblehead, Mass.

[73] Assignee: Optra, Inc., Topsfield, Mass.

[21] Appl. No.: 271,310

[22] Filed: Jul. 6, 1994

[51] Int. Cl.⁶ .................................................. G01B 9/02
[52] U.S. Cl. ................. 356/345; 356/356; 250/237 G
[58] Field of Search ........................... 356/345, 356, 356/363; 250/231.14, 231.16, 237 G

[56] References Cited

U.S. PATENT DOCUMENTS

| | | | |
|---|---|---|---|
| 4,776,698 | 10/1988 | Crosdale | 356/345 |
| 4,828,392 | 5/1989 | Nomura et al. | 356/356 |
| 5,098,190 | 3/1992 | Wijntjes et al. | 356/356 |
| 5,317,385 | 5/1994 | Silva et al. | 356/345 |
| 5,333,048 | 7/1994 | Michel et al. | 356/354 |
| 5,357,337 | 10/1994 | Michon et al. | 356/345 |

Primary Examiner—Samuel A. Turner
Attorney, Agent, or Firm—Mark P. White

[57] ABSTRACT

A detector is described, intended for use in metrology systems of the type which produce interference fringe patterns which contain a phase which is characteristic of the parameter under measurement, particularly displacement or position. The detector is in the form of an array of elements whose outputs are electrically interconnected so as to form three or more signals displaced from one another in phase by a fixed amount. The detector is provided on a single monolithic, silicon substrate using microelectronics techniques.

20 Claims, 9 Drawing Sheets

DETECTOR ARRAY FOR USE IN INTERFEROMETRIC METROLOGY SYSTEMS

BACKGROUND OF THE INVENTION

1. Field of the Invention

The present invention relates to metrology and more particularly to encoder-based measurement technology. An array of detectors is configured onto a monolithic substrate, which, when illuminated by an interference fringe pattern such as may be derived from a linear encoder, produces an electrical signal by which a determination of the phase of the pattern may be calculated with high precision and resolution. The elements of the detector array are electrically connected in such a way as to produce a number of parallel channels, so that the electrical signals produced by each such channel are identical to each other except for the phase of each channel.

2. Description Relative to the Prior Art

Interferometer techniques for the precise measurements of displacements are well known. Such techniques include, inter-alia, the use of encoders or diffraction gratings attached to the objects whose displacements are to be measured, and involve illumination of the gratings by light sources via suitable optics.

Other implementations forego the use of gratings, or scales, and use the surface characteristics of the object to be measured instead.

All such devices require a detector of some type, which transforms the optical signal into an electrical signal, which can then be processed to produce the desired displacement.

Many of the detectors in the past have been photovoltaic devices which produced electrical signals which varied in time in a periodic manner, wherein the number of cycles of the signal was indicative of the motion to be measured.

The so called Moiré technique devices have constituted a major type of the prior art in this regard. This technique is well known in the art, and therefore will not be further described herein. U.S. patents utilizing the Moiré technique include the following:

| U.S. Pat. No. | Applicant | Date Issued |
| --- | --- | --- |
| 3,166,624 | Vargady, Leslie O. | 01/19/65 |
| 3,833,303 | Burns et al. | 09/03/34 |
| 3,910,703 | Burns et al. | 10/07/75 |
| 4,775,788 | Harshberger et al. | 10/04/88 |
| 4,988,886 | Greivenkamp et al. | 01/29/91 |

Other, more recent inventions, utilize an optical signal having a spatial variation, rather than (or as well as) a time variation. The measurement of such a spatial variation requires a structured detector, array of detectors, or the like, in conjunction of the movement of the signal across the structured detector.

U.S. Pat. No. 5,113,386, issued on May 12, 1992, to Marchant, et al., utilizes a four-element array of detectors, with a spatial filter to eliminate the primarily zeroth order region of the detector image.

U.S. Pat. No. 5,098,190, issued on Mar. 24, 1992, to Wintjes et al, and assigned to Optra, Inc., the assignee of the current application, and which is incorporated herein by reference, describes a novel technique for the measurement of scale displacements with three output signals. This technique was also described in "Ultra-High Resolution Interferometric Sensors", *Optics and Photonics News*, Michael Hercher, November, 1991, pp. 24–29, and involves the use of a detector array to detect the phase of a multi-phase optical signal.

Said patent includes means for generating an interference fringe pattern as a function of the displacement to be measured. It also includes a structured transducer, or detector, apparatus for simultaneously generating three intensity-modulated optical signals, $I_r$, $I_s$, and $I_t$, which are related to the interference fringe pattern; electronic means for accumulating phase information proportional to the aspect of the interference fringe pattern; and means for converting the accumulated phase information to desired outputs indicative of the said displacement.

This technique, using a scale with 50 lines/mm., has demonstrated a resolution of less than a nanometer and an accuracy of ±10 nanometers. This performance is far in excess of that which can be achieved with conventional (Moiré) encoder read-out techniques. Moiré techniques generally allow interpolation of between one-eighth-scale spacing and one-sixteenth-scale spacing, corresponding to between one and three microns.

Devices based on this patent have been produced by Optra, Inc. for more than a year. Said devices, however, have used an array of discrete detector elements, each of which has been affixed to a base within a common plane. The outputs of these elements have then been routed off of the base to external, discrete electronic elements, which perform the required phase calculations.

This prior art has shown a number of shortcomings: first, it is expensive to manufacture. And secondly, it produces a relative phase measurement only, and is inaccurate for the generation of absolute phase information.

The current invention is an improved detector which generally performs the functions required for the above-cited patent in an improved way, with enhanced accuracy, and with lower cost and simplified manufacturing requirements.

The basis of the current invention is the incorporation of a multi-detector array onto a monolithic substrate, preferably a silicon PIN junction type.

The PIN technology is well-known, and is commonly used for photovoltaic detectors. PIN devices use an i-type semiconductor layer positioned between an n-type layer and a p-type layer. The following list contains several U.S. patents for PIN photovoltaic detectors.

| U.S. Pat. No. | Applicant | Date Issued |
| --- | --- | --- |
| 5,252,142 | Matsuda et al. | 10/12/93 |
| 5,246,506 | Arya et al. | 09/21/93 |
| 5,024,706 | Tatsuyuki et al. | 06/18/91 |
| 5,007,971 | Tatsuyuki et al. | 04/16/91 |

In the preferred, three-phase version of this invention the first array element is electrically connected to the fourth element, the seventh element, etc., while the second element is connected with the fifth, eighth, etc., and the third is connected with the sixth, ninth, etc., forming three electrical channels. Thus, when the array is illuminated with an interference fringe pattern whose spacing is equal to approximately three times the detector spacing, three distinct electrical signals are formed, one in each such channel, wherein each signal is one-hundred-twenty degrees displaced in phase from each other signal.

In addition, a mask is used to limit the region of detection to the area of the major array elements, thus reducing spurious signals caused by photosensitive areas of the substrate outside of, or at the edges of, the detector array area.

One of the preferred implementations also contains the electronic amplifiers on the substrate itself, with provisions to accurately trim the gains of these amplifiers during the manufacturing process, so that each of the three channels has the same gain.

Although the three-phase implementation is the preferred implementation, the technique described in U.S. Pat. No. 5,098,190 works equally well with four-phase, five phase, etc. versions. As the number of phases increases, the ease of signal-to-phase conversion increases, at the expense of an increased number of signal channels.

FIGS. 1a through 1d illustrate this principle. FIG. 1a shows 60 elements electrically interconnected to form three electrical phases. FIG. 1c shows the same 60 elements interconnected to form five phases. FIGS. 1b and 1d show the time variations of the electrical signals of the various phases of each embodiment. A comparison of FIGS. 1b and 1c shows that, for the three-phase embodiment, there are three zero crossings within a period in which five zero crossings are produced by the five-phase implementation. Zero crossings are detected with a minimum of signal processing, as opposed to measurement of a non-zero signal level. Thus, if only zero crossings are detected, it is clear that the five-phase embodiment produces greater precision than the three-phase embodiment.

However, the higher the number of phases, the more expensive the detector becomes to manufacture. Each phase requires separate electrical amplifiers and conditioners. Furthermore, the electrical transfer function of each channel must be individually tuned during manufacturing to insure uniformity of the channels.

The three-phase implementation is therefore thought to be the optimum one, requiring the minimum in electronic components and manufacturing costs, while at the same time allowing a signal-to-noise-limited computation of phase.

SUMMARY OF THE INVENTION

A general object of the current invention is to provide, at low cost, a highly precise multi-element detector array for use in laser metrology.

A specific object is to produce such a detector on a monolithic, silicon substrate.

A further specific object is to produce the detector in such a way as to limit the effects of spurious electrooptical signals from areas of the detector outside of the element array.

According to one aspect of the present invention an optical detector is provided, in the form of an array, comprising a multiplicity of parallel adjacent linear detector elements, with all of the detector elements on a common monolithic silicon substrate.

The number of elements in the array is an integer multiple of three, and every third element in the array is connected in parallel to every other third element, so that three separate electrical signals are provided. These electrical signals are amplified by electronic circuits which may also be contained within the common monolithic silicon substrate.

The detector array is utilized by illuminating it by an optical signal which produces an interference fringe pattern on the detector. This pattern should have interference fringes approximately equal in number to one-third the number of said elements.

The three separate electric signals, or channels, may then be used to compute the phase of the interference fringe pattern, which contains the measurement information desired.

According to another aspect of the invention, a mask is located between the optical detector and the optical source, so that the mask prevents the illumination of photosensitive areas in the vicinity of the detector array. As a result, the accuracy of the measurement is enhanced.

According to still another aspect of the invention, a bi-cell detector element, having an electrical output, is located adjacent to the detector array on the monolithic silicon substrate. The bi-cell detector may be illuminated by an optical beam reflected by the fiducial mark. This allows the precise determination of the location of said fiducial mark.

According to yet another aspect of the invention, the monolithic silicon substrate is of the PIN technology.

BRIEF DESCRIPTION OF THE DRAWINGS

These, and further features of the invention, may be better understood with reference to the accompanying specification and drawings depicting the preferred embodiment, in which:

FIG. 4b depicts the dual-pitch scale used in the generation of the dual interference fringe patterns for use with the dual array detector of FIG. 4a.

FIG. 6b depicts the X–Y scale used in the generation of the dual interference fringe patterns for use with the orthogonal array detector of FIG. 6a.

DETAILED DESCRIPTION OF THE PREFERRED EMBODIMENTS

Figure 1B:
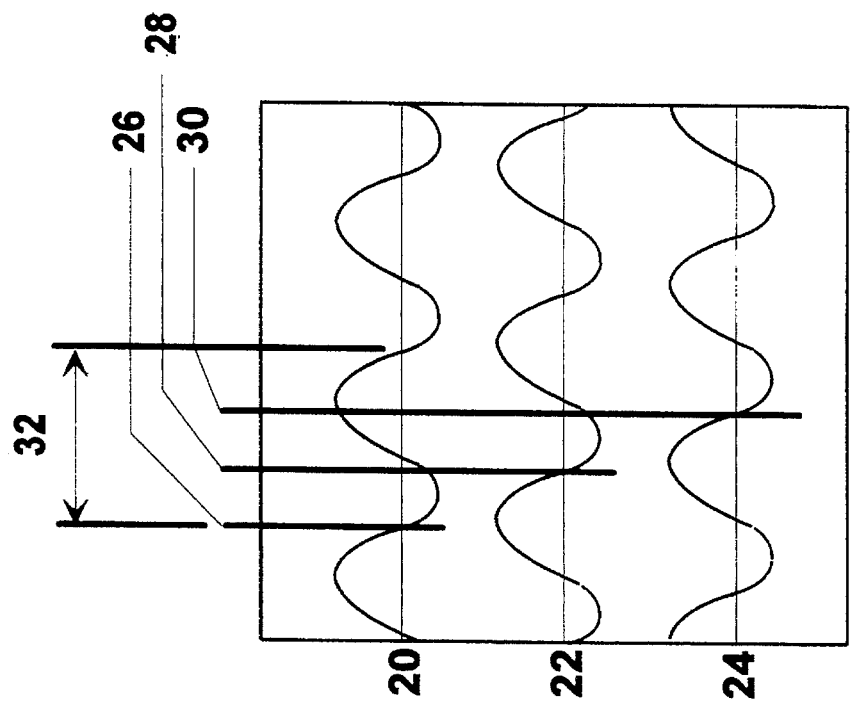
FIG. 1b the electrical signals in each of the three channels of FIG. 1a as a function of time, assuming a constant fringe velocity.
Figure 1A:
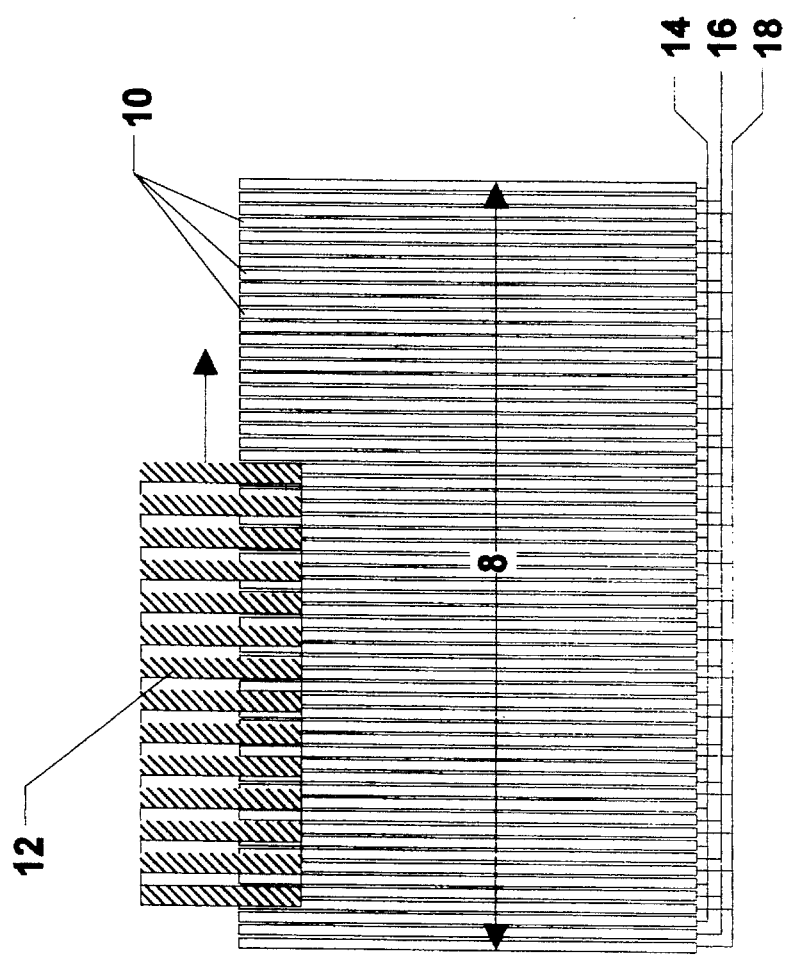
FIG. 1a depicts a single array detector containing 60 elements arranged into three phases, with each phase connected in parallel to form an electrical channel, and showing an interference fringe pattern superimposed on the array.
Figure 1D:
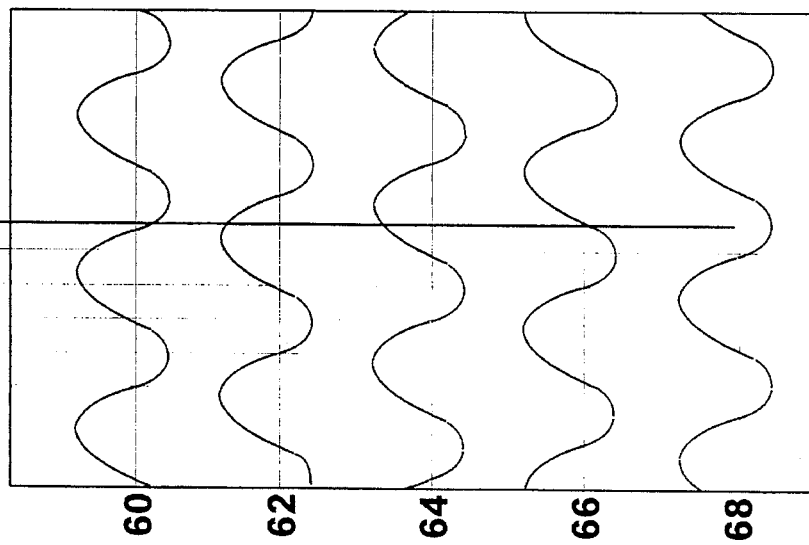
FIG. 1d depicts the electrical signals in each of the five channels of FIG. 1c as a function of time.

The first embodiment is a three-phase array wherein all of the elements are contained on a monolithic silicon substrate, and in which a mask is superimposed in the optical path to prevent the fringe pattern from generating spurious signals at the periphery of the array. This embodiment uses a PIN configuration. FIG. 1 shows the array 8, with elements 10, located on substrate 6, electrically connected so as to produce channels 14, 16, and 18. A typical spacing of the array is 50 elements per mm., each element having a width of 20 microns, and a length of 1 mm., located on a substrate about 1.35 mm. in width. As the interference fringe pattern, 12, moves across the elements, 10, the time variation of the signals of channels 14, 16, and 18, respectively, and shown in FIG. 1b as 20, 22, and 24, respectively. The time of a single cycle of signal 20, is shown as 32 in FIG. 1b, and the zero crossings, or time in which a signal becomes zero, are shown for each channel as 26, 28, and 30, respectively.

These three signals are then processed by electronics, which may be located either within the substrate or external to it, to produce the desired measurement, in accordance with U.S. Pat. No 5,098,190, which is incorporated by reference herein.

Figure 2:
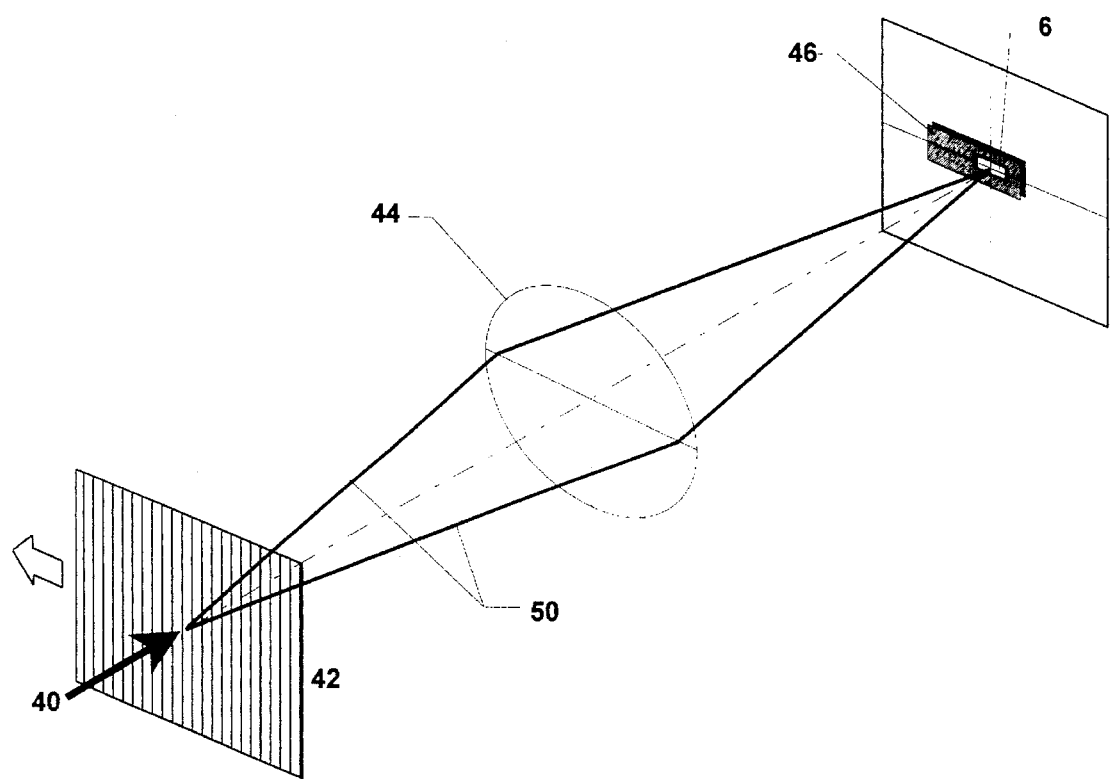
FIG. 2 depicts the method in which the detector array is used in one of the embodiments, showing the optic source, interference fringe grating, optical path, mask, and detector array.

FIG. 2 shows the optical source, 40, used to create the interference fringe pattern, 12, by diffracting the optical source by means of the scale 42, and then directing the diffracted beam through suitable optics, 44. The mask, 46, is placed in the optical path just in front of the array 8.

Figure 1C:
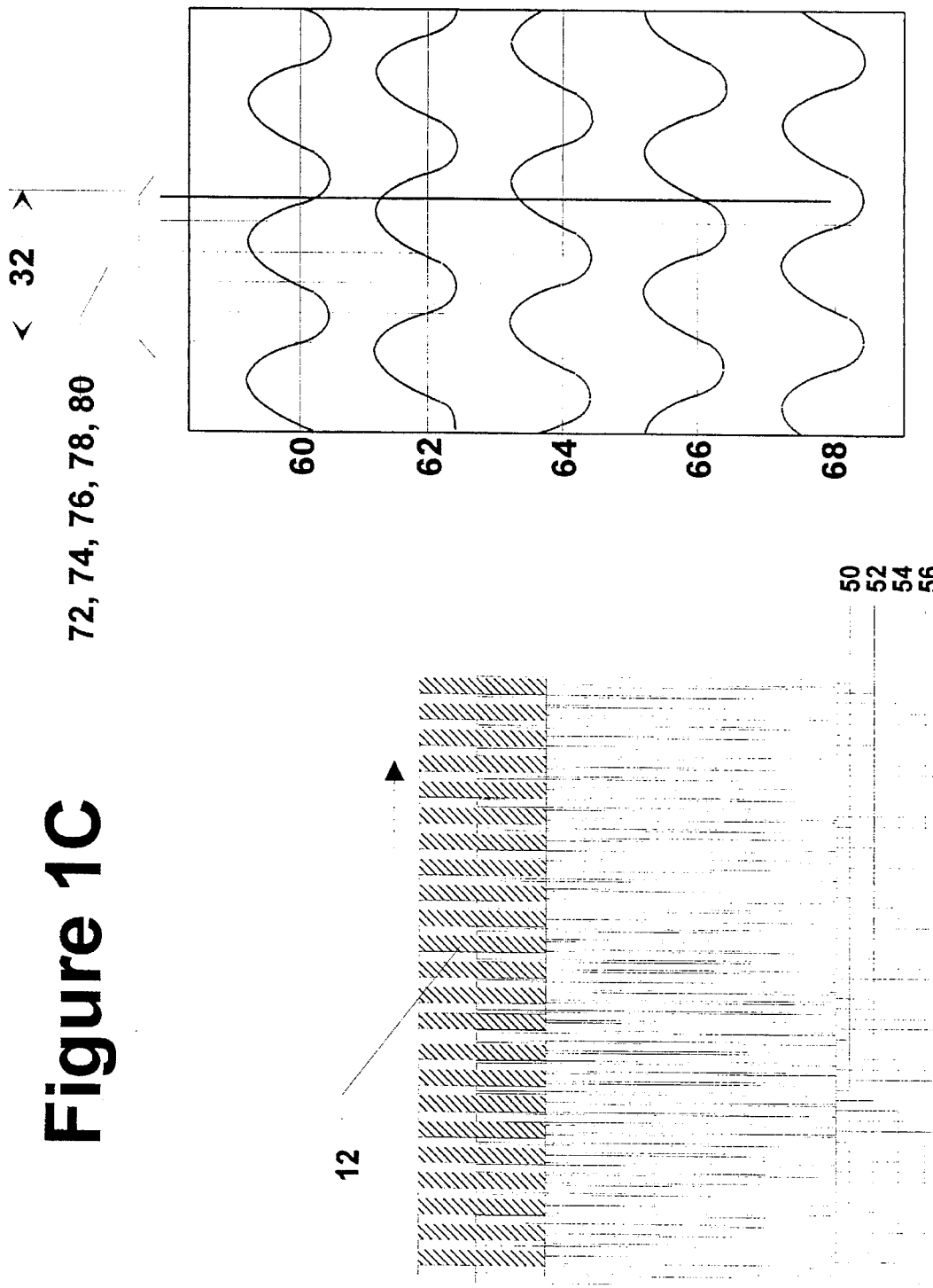
FIG. 1c depicts a single array detector containing 60 elements arranged into five phases, with each phase connected in parallel to form an electrical channel, and showing an interference fringe pattern superimposed on the array.

FIG. 1c shows an embodiment which is similar to that just described, except that the elements of the array are electrically interconnected to form five channels rather than three, as previously.

In FIG. 1c, the channels are shown as 50, 52, 54, 56, and 58. The signals output from these channels are shown as 60, 62, 64, 66, and 68, respectively, in FIG. 1d. These signals go to zero at times 72, 74, 76, 78, and 80, respectively.

The remainder of the implementation of this embodiment is identical to the first.

Figure 3A:
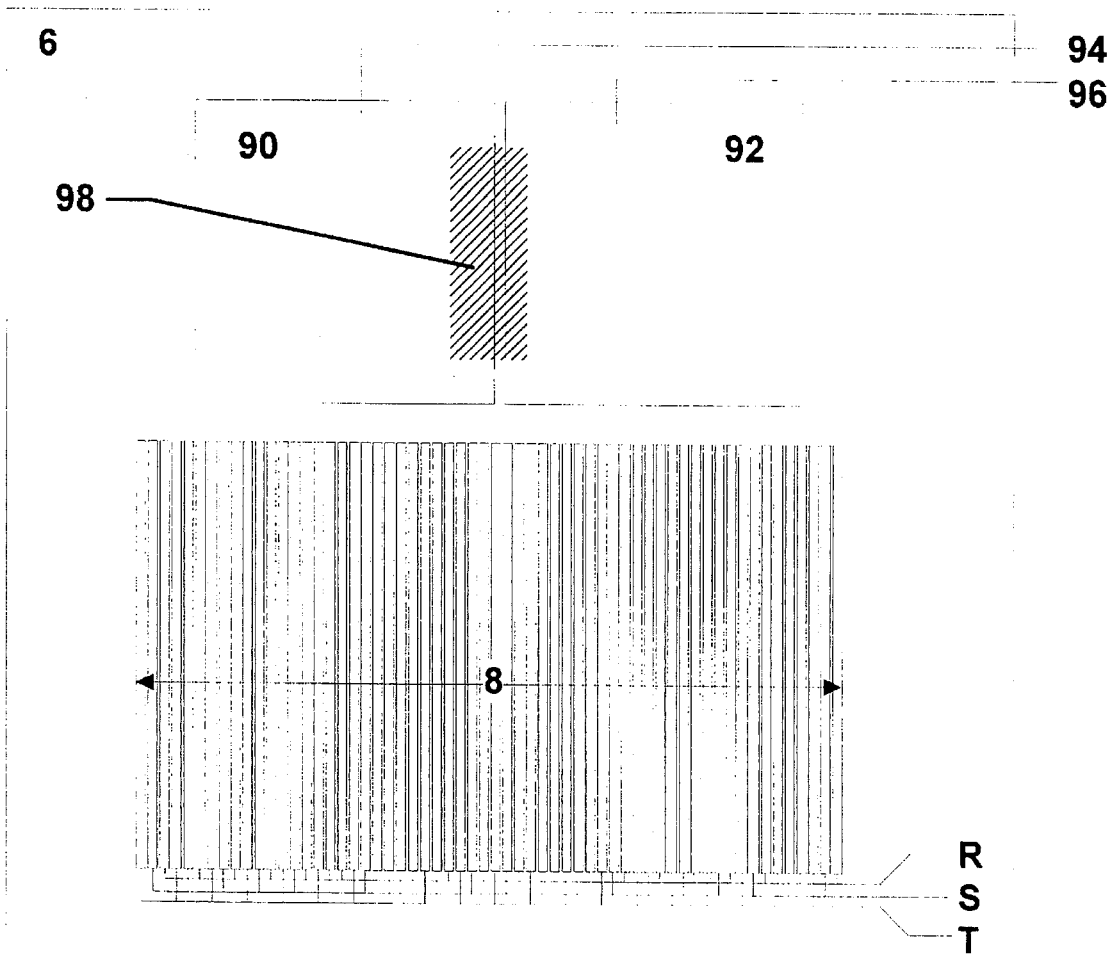
FIG. 3a depicts a detector consisting of a three-phased array of elements, and containing, in addition, a bi-cell detector on the same substrate.

FIG. 3a depicts a third embodiment similar to the first embodiment, but containing an added bi-cell detector, consisting of two elements, 90, and 92, on the PIN substrate 6, directly above the array 8. The electrical outputs of elements 90 and 92 are signals 94 and 96, respectively.

A typical embodiment of this type will have a substrate width of 1.5 mm.

Figure 3B:
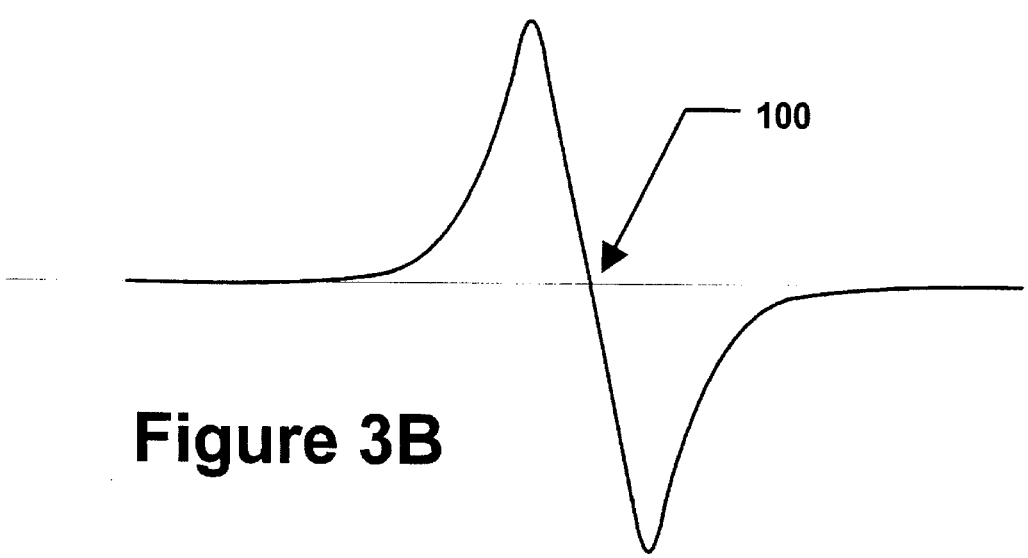
FIG. 3b depicts the electrical signals of the combined output of the bi-cell detector as a function of position.

The scale which is used to produce the interference fringe pattern should have an associated fiducial mark to utilize this embodiment of the detector array. The optics of the measurement system should be such that the image of the fiducial mark will impinge on the bi-cell detector at the same time as the interference fringe pattern falls on the detector array. The electrical signals of 94 and 96, when subtracted from one another, produce the signal shown in FIG. 3b, with zero crossing 100. The zero crossing is detected to give an absolute position measurement.

Figure 4A:
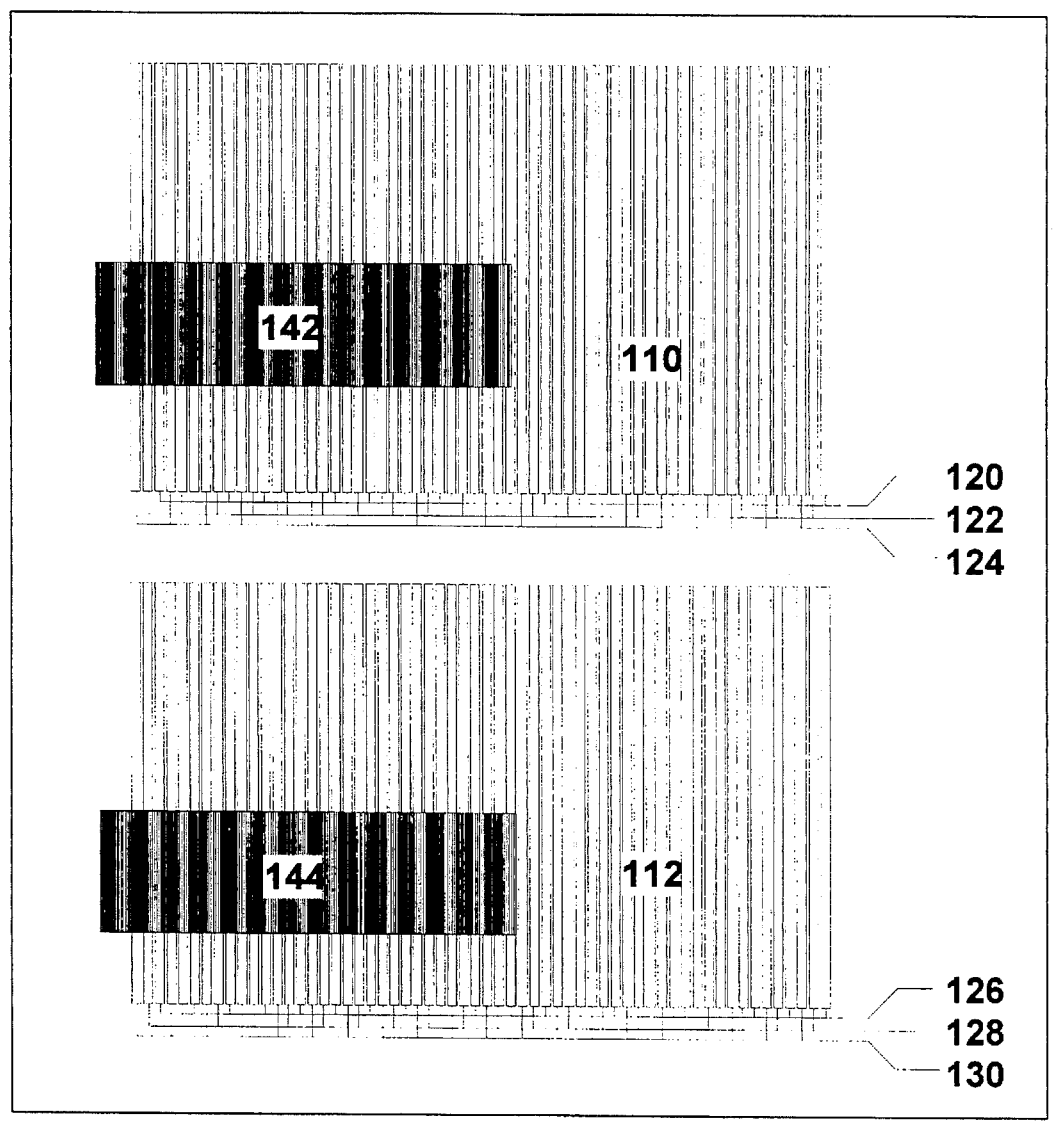
FIG. 4a depicts a detector consisting of two three-phase arrays, one above the other on a common substrate, for use with dual-pitch scale absolute measurement detector techniques.

FIG. 4a shows a fourth embodiment of the detector. This embodiment contains two arrays, 110, and 112, one above the other on PIN substrate 6, and with the long axis of all elements parallel to each other.

Upper array 110 has its elements connected in three electrical channels 120, 122, and 124, while lower array is likewise configured to create three electrical channels 126, 128, and 130.

Figure 4B:
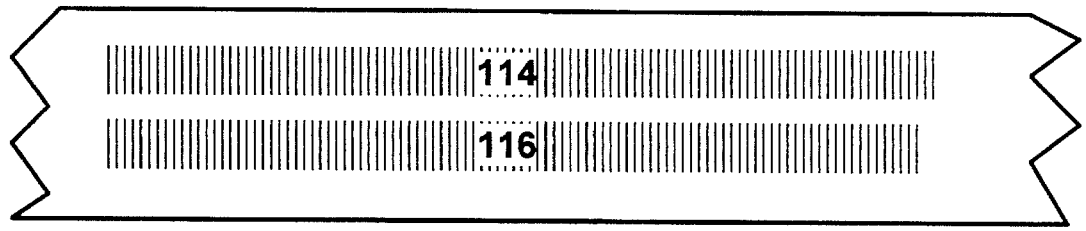
Figure 5:
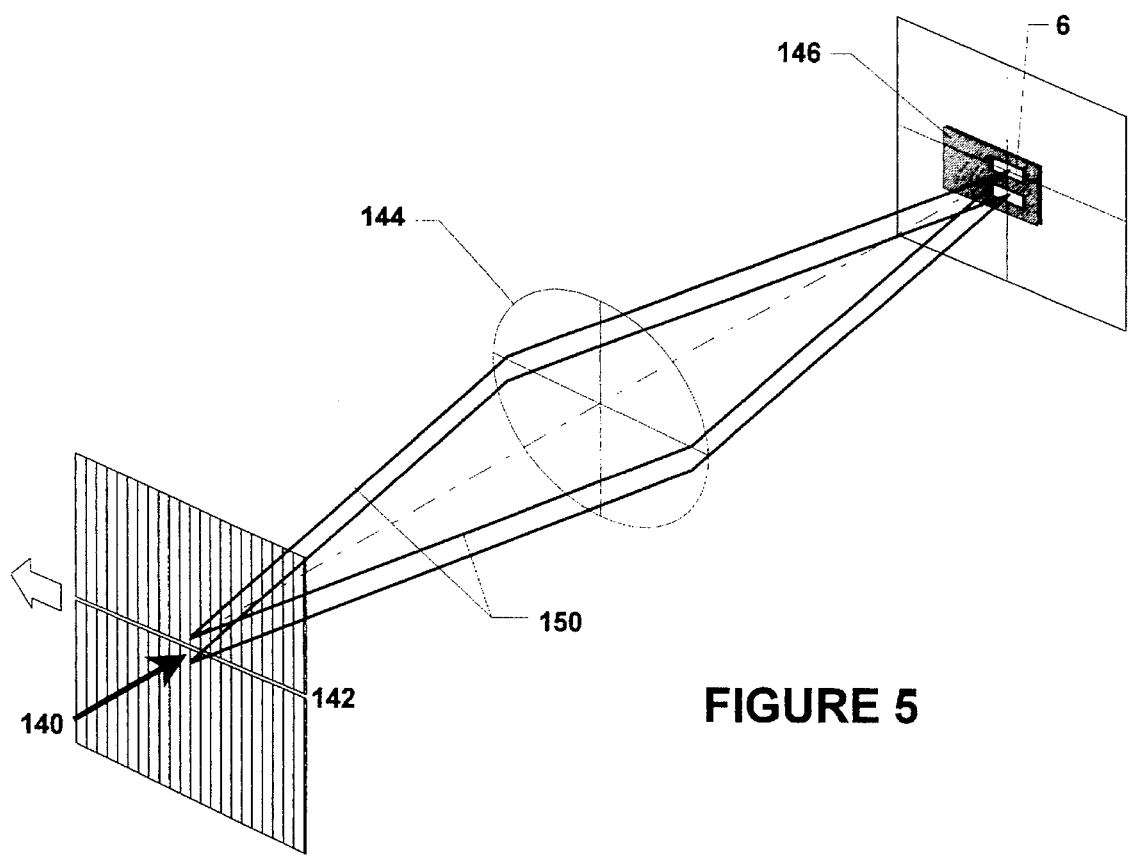
FIG. 5 depicts the method in which the dual detector array is used in its respective embodiment, showing the optic source, interference fringe grating, optical path, mask, and detector ayray.

The interference fringe patterns which fall on the detector of FIG. 4a are produced by diffracting an optical signal off of a dual-pitch scale, as shown in FIG. 4b. This dual-pitch scale actually consists of two scales 114 and 116, one above the other, with the number of lines per inch varying slightly between the two. A typical dual-pitch scale is 200 mm. in length, with the upper scale having 50 lines per mm., and the lower scale having 50+1 lines per mm.

The optics of the measurement system are set up so that when the dual-pitch scale is illuminated by the optical source, the diffracted radiation will form two distinct interference fringe patterns 140 and 142, having slightly different periods. Interference fringe pattern 144 should fall entirely upon array 110, and interference fringe pattern 144 should fall entirely upon array 112, as depicted in FIG. 4a.

Because the periods of interference fringe patterns 142 and 142 are different, the time between zero crossings of signals contained in channels 120, 122, and 124 will be slightly different than those contained in channels 126, 128, and 130. These signals can be combined to yield an absolute position.

It should be noted that the three phase technique upon which the present invention depends measures a change in position only, rather that absolute position, as described in U.S. Pat. No. 5,098,190. The dual-pitch scale technique, as incorporated into the three-phase technique, allows for the measurement of an absolute position.

Figure 8:
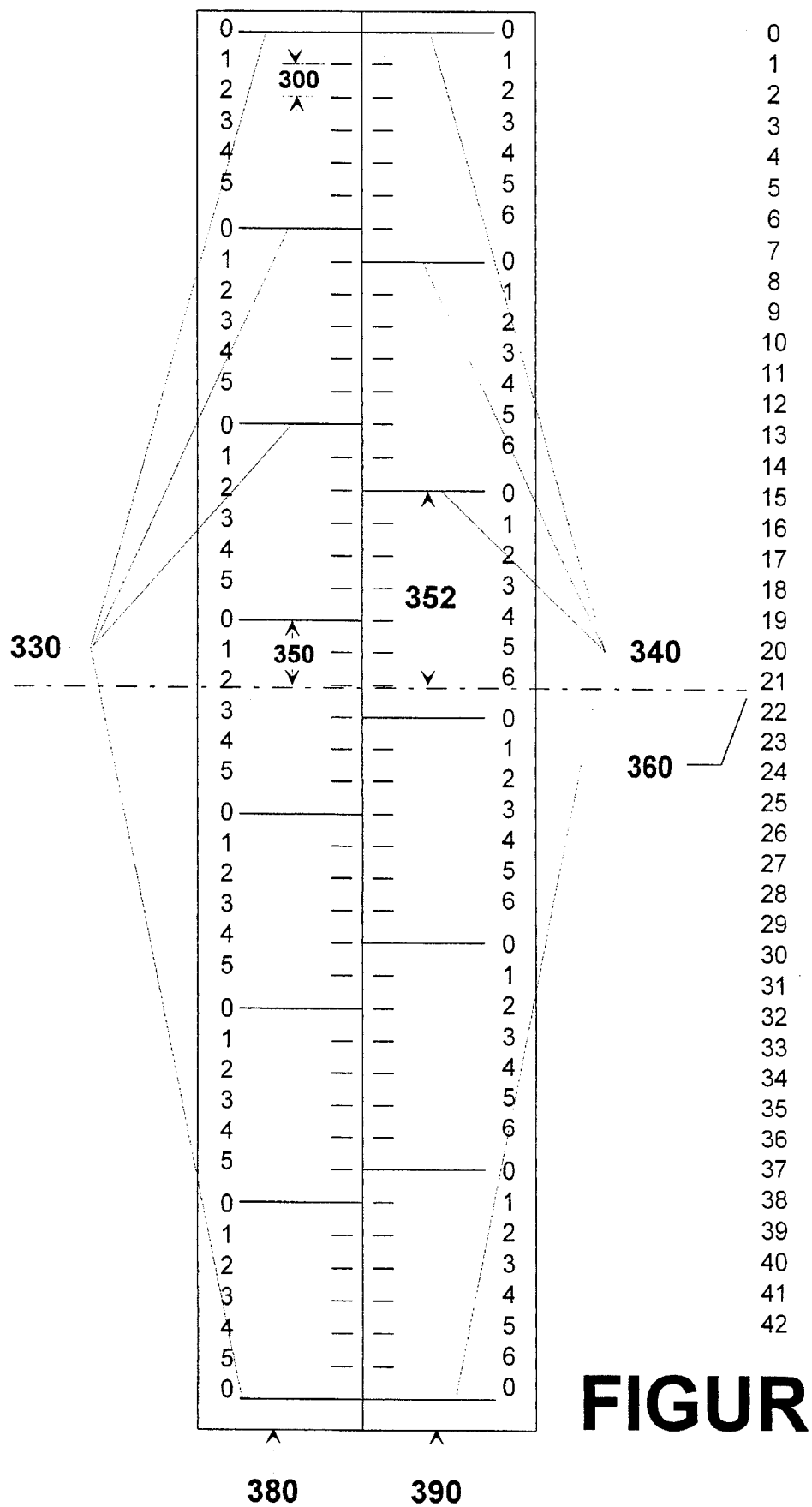
FIG. 8 depicts a detailed view of the dual-pitch scale, showing how the absolute position measurements can be made by use of said scale.

FIG. 8 shows the principle on which the dual-scale technique is applied in the present instance. This figure shows a dual scale, consisting of two scales, side by side, the left scale having six divisions per major unit, 330 and the right scale having seven divisions per major unit, 340. The size of the each division, 300, is the same for both scales, and is equal to one resolution element. Note that the numbers six and seven division per unit, respectively, are chosen for the purpose of illustration only, and do not represent values to which this invention is limited.

In this figure, the absolute position of any point along the dual scale can be designated as an absolute position, p, 340. On FIG. 8, a p of absolute value 20 has been arbitrary selected for the purposes of illustration.

p may be located by designating the position on the left scale 380 and a position on the right scale 390.

Because the three-phase technique produces a relative measurement only, this position as measured on the left scale will be a displacement $d_1$ (350) from the nearest major unit 330.

Thus, if there are $n_1$ divisions per major unit on the left scale, displacement $d_1$ may be designated as $$d_1 = p \bmod n_1 \qquad [1]$$

Similarly, on the right scale, the distance $d_r$ (352) from the nearest major unit reference 340 will be designated as $$d_r = p \bmod n_r \qquad [2]$$

where number of divisions per major unit on the right scale $n_r$.

Thus, the point p may be uniquely described by designating the values $d_l$ and $d_r$. And since there are $n_l$ possible different values of $d_l$, and since there are $n_r$ possible different values of $d_r$, the number of unique combinations of $d_l$ and $d_r$ is equal to Nt, where $$Nt = d_r * d_l \qquad [3]$$

In the example shown in FIG. 8, $d_l=6$ and $d_r=7$, resulting in a range of 42 divisions in which a position may be uniquely described by designating a particular position relative to the left scale and another relative to the right scale.

In the example shown, the absolute position 60, may be uniquely designated by relative position 2 on the left scale and a relative position 6 on the right scale. It should be noted that there is no other position within the forty-two divisions shown having these two relative scale positions.

Figure 6A:
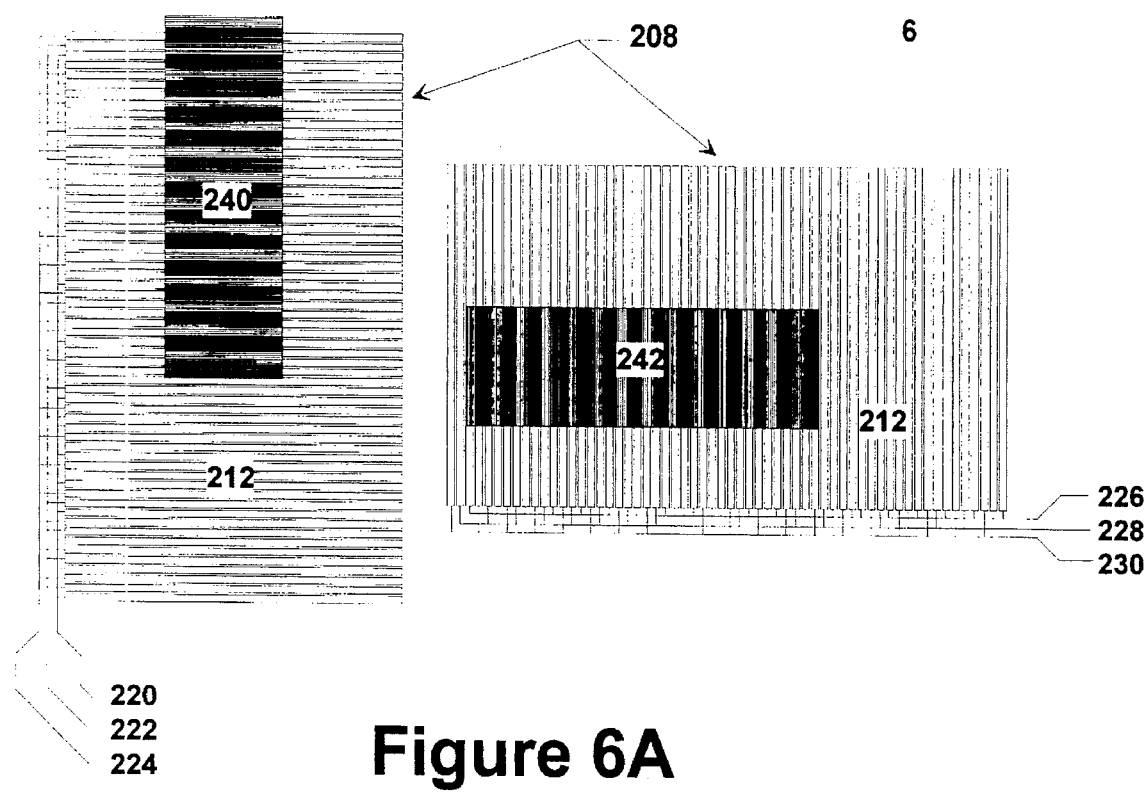
FIG. 6a depicts the orthogonal detector, consisting of two three-phase arrays, oriented at right angles to each other on a common substrate, for use with orthogonal scales; that is, an X–Y grating or crossed grating.

A final embodiment is shown in FIG. 6a. This embodiment contains two identical three-phase arrays, 210, and 212, one oriented at right angles to the other on PIN substrate 6. A typical such configuration contains ninety elements in each array, and is located on a substrate about 1 mm. in width and 1.35 mm. in length.

Array 210 has its elements connected in three electrical channels 220, 222, and 224, while array 212 is likewise configured to create three electrical channels 226, 228, and 130.

Figure 6B:
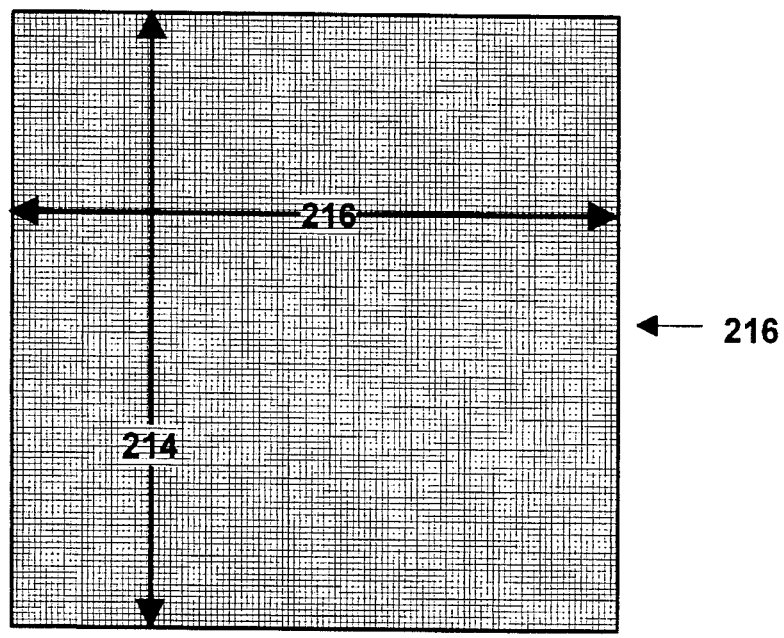

The interference fringe patterns which fall on the detector of FIG. 6a are produced by diffracting an optical signal off of an X–Y scale, as shown in FIG. 6b. This X–Y scale has the form of a grid, with vertical rulings 214 and horizontal rulings 216, at right angles to each other. A typical X–Y scale is 50 to 100 mm. in length, and 50–100 mm. in width having on the order of 50 lines per mm.

Figure 7:
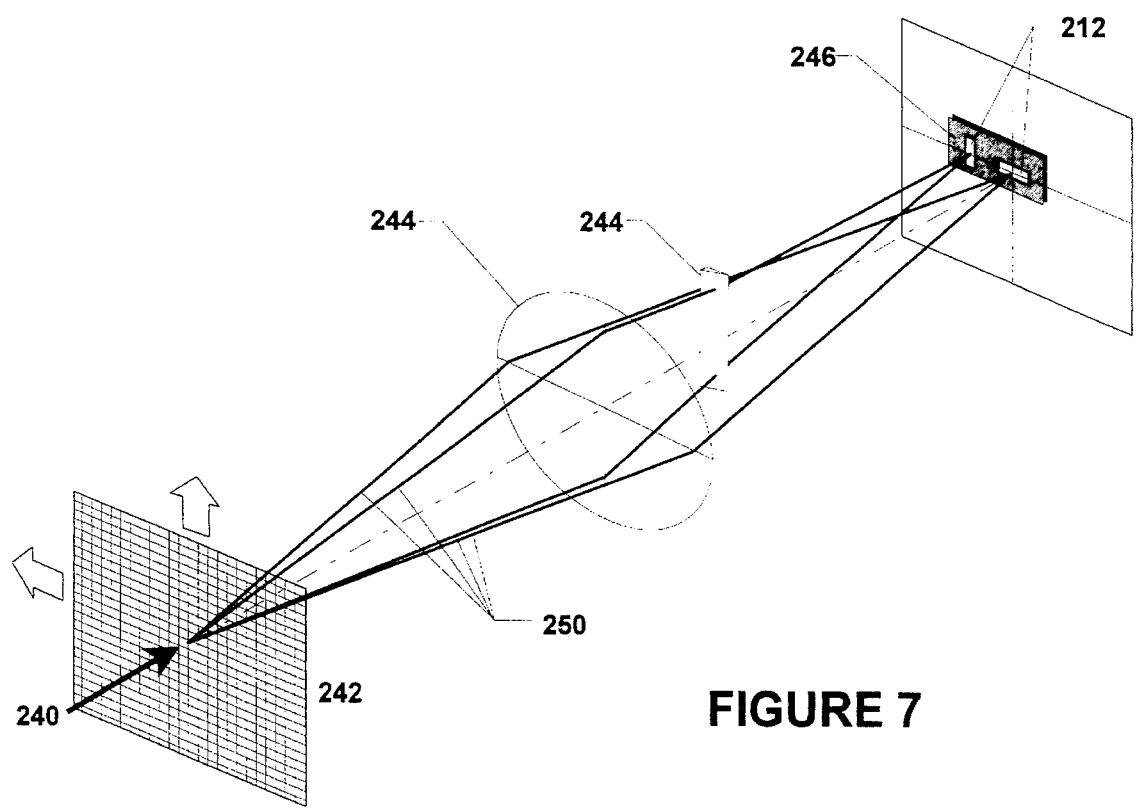
FIG. 7 depicts the method in which the dual detector array is used in its respective embodiment, showing the optic source, interference fringe grating, optical path, mask, and detector array.

The optics of the measurement system, as depicted in FIG. 7, are set up so that when the X–Y scale is illuminated by the optical source, the diffracted radiation will form two distinct interference fringe patterns 240 and 242, at right angles to each other. The optics of the measurement contain a small prism which directs fringe pattern 240 onto array 210, which fringe pattern 242 goes directly to array 212, as depicted in FIGS. 6a and 7.

FIG. 7 shows the optical source, 240, used to create the interference fringe pattern, 212, by diffracting the optical source by means of the X–Y scale 242, and then directing the diffracted beams 250 through suitable optics, 244. A small prism 248 bends the diffraction pattern to the left, so that a part of it falls upon detector array 210, while the remainder falls on detector array 212. The mask, 246, is placed in the optical path just in front of the array assembly 208.

While the invention has been described with reference to specific embodiments, it will be apparent that improvements and modifications may be made within the purview of the invention without departing from the scope of the invention defined in the appended claims.

I claim:

1. An optical detector having an absolute position comprising a multiplicity of identical detector arrays, each such detector array comprising a multiplicity of adjacent linear detector elements on a common silicon substrate wherein, for each such detector array:

a) the number of elements is an integral multiple of three; and b) every third element is electrically connected in parallel, providing three separate electrical channels thereby, so that when each said detector array is illuminated by an optical signal which produces an interference fringe pattern on the detector array, which interference fringe pattern has a phase, and which interference fringe pattern contains a number of interference fringes approximately equal to one-third the number of said elements, said three electrical channels will generate three electrical signals which are identical to each other except that each such electrical signal will be one-hundred and twenty degrees displaced in phase from each other such electrical signal, whereby said three electrical signals may be used as input signals to a computational device together with the three electrical signals from each of the other detector arrays, which computational device can, with high precision and resolution, determine said phase of each said interference fringe pattern, as well as precisely determining the absolute position of the optical detector in one or more dimensions.

2. The optical detector of claim 1, wherein:

the number of identical detector arrays is two; and one such detector array is positioned above the other, so that the individual elements of each such array are parallel to the elements of the other such array, whereby when each said detector array is illuminated by a separate interference fringe pattern having a precisely defined phase and originating from an optical source diffracted by a dual-pitch scale, the output signals from each detector array which contain phase signal information for each array may be further processed by a computational device which, with high precision and resolution, produces an output signal representing the phase of each said interference fringe pattern, so that the absolute position of said dual-pitch scale may be determined thereby.

3. The optical detector of claim 1, wherein:

the number of identical detector arrays is two;

one such detector array is positioned to the side of the other; and the individual elements of each such array are perpendicular to the elements of the other such detector array, whereby when each said detector array is illuminated by a separate interference fringe pattern having a precisely defined phase and originating from an optical source diffracted by an X–Y scale, the output signals from each detector array which contain phase signal information for each detector array may be further processed by a computational device which, with high precision and resolution, produces two output signals representing the phase of each said interference fringe pattern, so that the position of said X–Y scale may be determined thereby.

4. An optical detector, comprising:

a) a multiplicity of adjacent linear detector elements in the form of a detector array; and b) a bi-cell detector element, having an electrical output, located adjacent to said array, wherein:

I. all of the detector elements, including the bi-cell, are on a common silicon substrate;

II. the number of linear detector elements is an integral multiple of three; and III. every third linear detector element is electrically connected in parallel, providing three separate electrical channels thereby, so that when said detector array is illuminated by an optical signal which produces an interference fringe pattern on the detector, which interference fringe pattern has a phase, and which interference fringe pattern contains a number of interference fringes approximately equal to one-third the number of said elements, said three electrical channels will generate electrical signals which are identical to each other except that each such electrical signal will be one-hundred and twenty degrees displaced in phase from each other such electrical signal, and so that when said bi-cell detector is illuminated by an optical signal derived from a fiducial mark a bi-cell electrical output of the bi-cell detector element is produced, whereby the three electrical signals and the bi-cell electrical output are used as input signals to a computational device which, with high precision and resolution, determines the phase of said interference fringe pattern and the location of the fiducial mark, which location can be used to initialize the phase measurement, and thereby provide the means for making absolute position measurements.

5. A detector comprising two identical detector arrays, wherein:

each such detector array conforms to claim 4;

all of the detector elements are on a common silicon substrate; and one such detector array is positioned above the other, so that the individual elements of each such array are parallel to the elements of the other such array, whereby when each said detector array is illuminated by a separate interference fringe pattern having a precisely defined phase and originating from an optical source diffracted by a dual-pitch scale, the output signals from each detector array which contain phase signal information for each array may be further processed by a computational device which, with high precision and resolution, produces an output signal representing the phase of each said interference fringe pattern, so that the absolute position of said dual-pitch scale may be determined thereby.

6. An optical detector, comprising:

a) a multiplicity of electronic signal amplification devices; and b) a multiplicity of adjacent linear detector elements in the form of a detector array, wherein I. all of the detector elements are on a common silicon substrate;

II. the number of elements is an integral multiple of three;

III. every third element is electrically connected in parallel, providing three separate electrical channels thereby;

IV. the electronic signal amplification devices are contained within the substrate; and V. the electronic signal amplification devices are provided with means to adjustably modify their electronic characteristics during the fabrication process, whereby the detector may be electrically balanced, so that when said detector array is illuminated by an optical signal which produces an interference fringe pattern on the detector array, which interference fringe pattern has a phase, and which interference fringe pattern contains a number of interference fringes approximately equal to one-third the number of said elements, said three electrical channels will generate electrical signals which are identical to each other except that each such electrical signal will be one-hundred and twenty degrees displaced in phase from each other such electrical signal, whereby said three electrical signals, after amplification by the electronic signal amplification devices, may be used as input signals to a computational device which can, with high precision and resolution, determine said phase of said interference fringe pattern.

7. An optical detector, comprising a) a multiplicity of adjacent linear detector elements in the form of a detector array; and b) a mask located between the optical detector and the optical source, wherein, for each such detector array:

I. all of the detector elements are on a common silicon substrate;

II. the number of elements is an integral multiple of three; and

III. every third element is electrically connected in parallel, providing three separate electrical channels thereby, so that when said detector array is illuminated by an optical signal which produces an interference fringe pattern on the detector, which interference fringe pattern has a phase, and which interference fringe pattern contains a number of interference fringes approximately equal to one-third the number of said elements, said three electrical channels will generate electrical signals which are identical to each other except that each such electrical signal will be one-hundred and twenty degrees displaced in phase from each other such electrical signal, whereby said three electrical signals may be used as input signals to a computational device which can, with high precision and resolution, determine said phase of said interference fringe pattern, and whereby the mask prevents the illumination of photosensitive areas in the vicinity of the detector array, and so that spurious photo currents in the detector are prevented and accuracy of the phase determination enhanced.

8. The detector of claim 7, further comprising an additional bi-cell detector element, having an electrical output, located adjacent to said array whereby said bi-cell detector may be illuminated by an optical signal derived from a fiducial mark so that the electrical output of the bi-cell detector element may be used to precisely determine the location of said fiducial mark.

9. A detector comprising two identical detector arrays, wherein:

each such detector array conforms to claim 7;

all of the detector elements are on a common silicon substrate; and one such detector array is positioned above the other, so that the individual elements of each such array are parallel to the elements of the other such array, whereby when each said detector array is illuminated by a separate interference fringe pattern having a precisely defined phase and originating from an optical source diffracted by a dual-pitch scale, the output signals from each detector array which contain phase signal information for each array may be further processed by a computational device which, with high precision and resolution, produces an output signal representing the phase of each said interference fringe pattern, so that the absolute position of said dual-pitch scale may be determined thereby.

10. An optical detector comprising two identical detector arrays, each such detector array conforming to claim 7, wherein:

one such detector array is positioned to the side of the other;

all of the detector elements are on a common silicon substrate; and the individual elements of each such array are perpendicular to the elements of the other such detector array, whereby when each said detector array is illuminated by a separate interference fringe pattern having a precisely defined phase and originating from an optical source diffracted by an X–Y scale, the output signals from each detector array which contain phase signal information for each detector array may be further processed by a computational device which, with high precision and resolution, produces an output signal representing the phase of each said interference fringe pattern, so that the position of said X–Y scale may be determined thereby.

11. An optical detector having an absolute position comprising a multiplicity of identical detector arrays, each such detector array comprising a multiplicity of adjacent linear detector elements on a common silicon substrate wherein, for each such detector array:

a) the number of elements is an integral multiple of n where n is an integer greater than three; and b) every $n^{th}$ element is electrically connected in parallel, providing n separate electrical channels thereby, so that when each said detector array is illuminated by an optical signal which produces an interference fringe pattern on the detector array, which interference fringe pattern has a phase, and which interference fringe pattern contains a number of interference fringes approximately equal to one-$n^{th}$ the number of said elements, said n electrical channels will generate n electrical signals which are identical to each other except that each such electrical signal will be 360/n degrees displaced in phase from each other such electrical signal, whereby said n electrical signals may be used as input signals to a computational device together with the n electrical signals from each of the other detector arrays, which computational device can, with high precision and resolution, determine said phase of each said interference fringe pattern, as well as precisely determining the absolute position of the optical detector in one or more dimensions.

12. The optical detector of claim 11, wherein:

the number of identical detector arrays is two; and one such detector array is positioned above the other, so that the individual elements of each such array are parallel to the elements of the other such array, whereby when each said detector array is illuminated by a separate interference fringe pattern having a precisely defined phase and originating from an optical source diffracted by a dual-pitch scale, the output signals from each detector array which contain phase signal information for each array may be further processed by a computational device which, with high precision and resolution, produces an output signal representing the phase of each said interference fringe pattern, so that the absolute position of said dual-pitch scale may be determined thereby.

13. The optical detector of claim 11, wherein:

the number of identical detector arrays is two;

one such detector array is positioned to the side of the other; and the individual elements of each such array are perpendicular to the elements of the other such detector array, whereby when each said detector array is illuminated by a separate interference fringe pattern having a precisely defined phase and originating from an optical source diffracted by an X–Y scale, the output signals from each detector array which contain phase signal information for each detector array may be further processed by a computational device which, with high precision and resolution, produces two output signals representing the phase of each said interference fringe pattern, so that the position of said X–Y scale may be determined thereby.

14. An optical detector, comprising:

a) a multiplicity of adjacent linear detector elements in the form of a detector array; and b) a bi-cell detector element, having an electrical output, located adjacent to said array, wherein:

I. all of the detector elements, including the bi-cell, are on a common silicon substrate;

II. the number of elements is an integral multiple of n, where n is an integer greater than three;

III. every $n^{th}$ element is electrically connected in parallel, providing n separate electrical channels thereby, so that when each said detector array is illuminated by an optical signal which produces an interference fringe pattern on the detector, which interference fringe pattern has a phase, and which interference fringe pattern contains a number of interference fringes approximately equal to one-$n^{th}$ the number of said elements, said n electrical channels will generate electrical signals which are identical to each other except that each such electrical signal will be 360/n degrees displaced in phase from each other such electrical signal, whereby said n electrical signals may be used as input signals to a computational device which can, with high precision and resolution, determine said phase of said interference fringe pattern and the location of the fiducial mark, which location can be used to initialize the phase measurement, and thereby provide the means for making absolute position measurements.

15. A detector comprising two identical detector arrays, wherein:

each such detector array conforms to claim 14;

all of the detector elements are on a common silicon substrate; and one such detector array is positioned above the other, so that the individual elements of each such array are parallel to the elements of the other such array, whereby when each said detector array is illuminated by a separate interference fringe pattern having a precisely defined phase and originating from an optical source diffracted by a dual-pitch scale, the output signals from each detector array which contain phase signal information for each array may be further processed by a computational device which, with high precision and resolution, produces an output signal representing the phase of each said interference fringe pattern, so that the absolute position of said dual-pitch scale may be determined thereby.

16. An optical detector, comprising:

a) a multiplicity of electronic signal amplification devices; and b) a multiplicity of adjacent linear detector elements in the form of a detector array, wherein I. all of the detector elements are on a common silicon substrate;

II. the number of elements is an integral multiple of n, where n is an integer greater than three;

III. every $n^{th}$ element is electrically connected in parallel, providing n separate electrical channels thereby, IV. the electronic signal amplification devices are contained within the substrate; and V. the electronic signal amplification devices are provided with means to adjustably modify their electronic characteristics during the fabrication process, whereby the detector may be electrically balanced, so that when said detector array is illuminated by an optical signal which produces an interference fringe pattern on the detector array, which interference fringe pattern has a phase, and which interference fringe pattern contains a number of interference fringes approximately equal to one-$n^{th}$ the number of said elements, said n electrical channels will generate electrical signals which are identical to each other except that each such electrical signal will be 360/n degrees displaced in phase from each other such electrical signal, whereby said n electrical signals, after amplification by the electronic signal amplification devices, may be used as input signals to a computational device which can, with high precision and resolution, determine said phase of said interference fringe pattern.

17. An optical detector, comprising a) a multiplicity of adjacent linear detector elements in the form of a detector array; and b) a mask located between the optical detector and the optical source, wherein, for each such detector array:

I. all of the detector elements are on a common silicon substrate;

II. the number of elements is an integral multiple of n, where n is an integer greater than three; and III. every $n^{th}$ element is electrically connected in parallel, providing n separate electrical channels thereby, so that when said detector array is illuminated by an optical signal which produces an interference fringe pattern on the detector, which interference fringe pattern has a phase, and which interference fringe pattern contains a number of interference fringes approximately equal to one-$n^{th}$ the number of said elements, said n electrical channels will generate electrical signals which are identical to each other except that each such electrical signal will be 360/n degrees displaced in phase from each other such electrical signal, whereby said n electrical signals, after amplification by the electronic signal amplification devices, may be used as input signals to a computational device which can, with high precision and resolution, determine said phase of said interference fringe pattern, and whereby the mask prevents the illumination of photosensitive areas in the vicinity of the detector array, and so that spurious photo currents in the detector are prevented and accuracy of the phase determination enhanced.

18. The detector of claim 17, further comprising an additional bi-cell detector element, having an electrical output, located adjacent to said array whereby said bi-cell detector may be illuminated by an optical signal derived from a fiducial mark so that the electrical output of the bi-cell detector element may be used to precisely determine the location of said fiducial mark.

19. A detector comprising two identical detector arrays, wherein:

each such detector array conforms to claim 17;

all of the detector elements are on a common silicon substrate; and one such detector array is positioned above the other, so that the individual elements of each such array are parallel to the elements of the other such array, whereby when each said detector array is illuminated by a separate interference fringe pattern having a precisely defined phase and originating from an optical source diffracted by a dual-pitch scale, the output signals from each detector array which contain phase signal information for each array may be further processed by a computational device which, with high precision and resolution, produces an output signal representing the phase of each said interference fringe pattern, so that the absolute position of said dual-pitch scale may be determined thereby.

20. An optical detector comprising two identical detector arrays, each such detector array conforming to claim 17, wherein:

one such detector array is positioned to the side of the other;

all of the detector elements are on a common silicon substrate; and the individual elements of each such array are perpendicular to the elements of the other such detector array, whereby when each said detector array is illuminated by a separate interference fringe pattern having a precisely defined phase and originating from an optical source diffracted by an X–Y scale, the output signals from each detector array which contain phase signal information for each detector array may be further processed by a computational device which, with high precision and resolution, produces an output signal representing the phase of each said interference fringe pattern, so that the position of said X–Y scale may be determined thereby.

* * * * *